(No Model.) 2 Sheets—Sheet 1.

R. H. COONS.
BEE HIVE.

No. 327,068. Patented Sept. 29, 1885.

WITNESSES
R. H. COONS
INVENTOR
by C. A. Snow & Co.
Attorneys

N. PETERS, Photo-Lithographer, Washington, D. C.

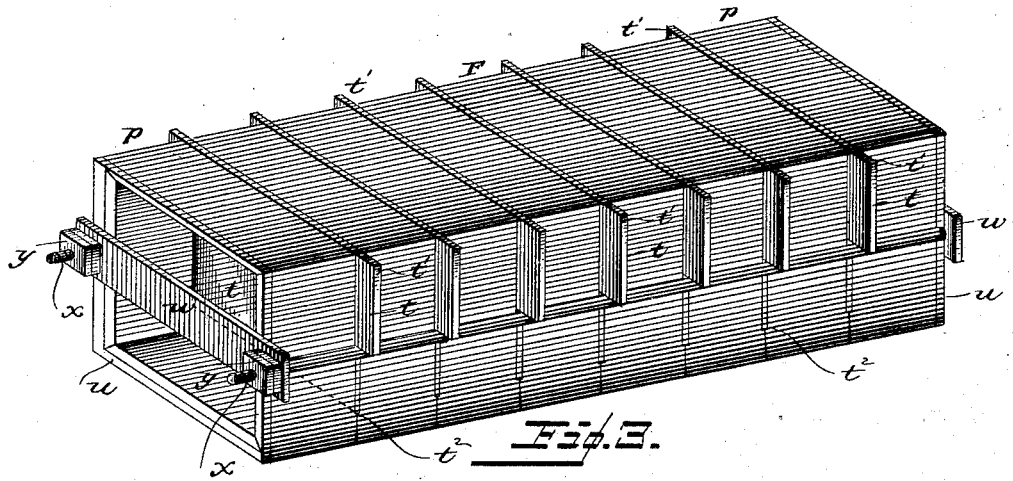
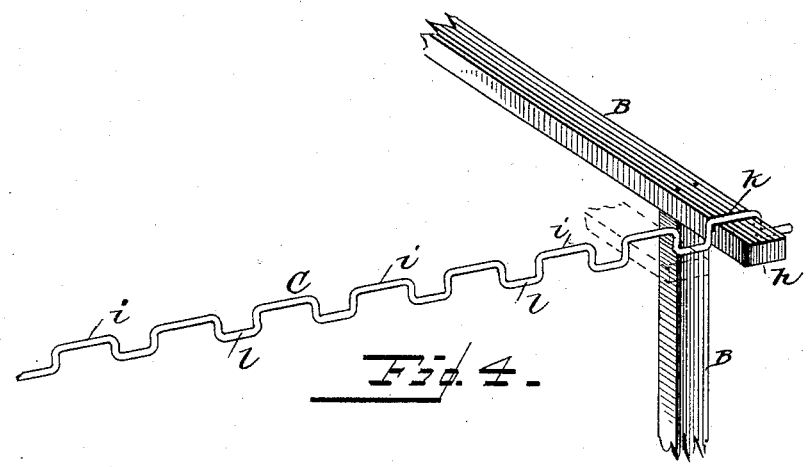

UNITED STATES PATENT OFFICE.

ROBERT H. COONS, OF TAYLOR, MISSOURI.

BEE-HIVE.

SPECIFICATION forming part of Letters Patent No. 327,068, dated September 29, 1885.

Application filed January 28, 1885. (No model.)

*To all whom it may concern:*

Be it known that I, R. H. COONS, a citizen of the United States, residing at Taylor, in the county of Marion and State of Missouri, have invented a new and useful Improvement in Bee-Hives, of which the following is a specification, reference being had to the accompanying drawings.

My invention relates to an improvement in bee-hives; and it consists in the peculiar construction and combination of devices that will be more fully set forth hereinafter, and particularly pointed out in the claims.

Figure 1:
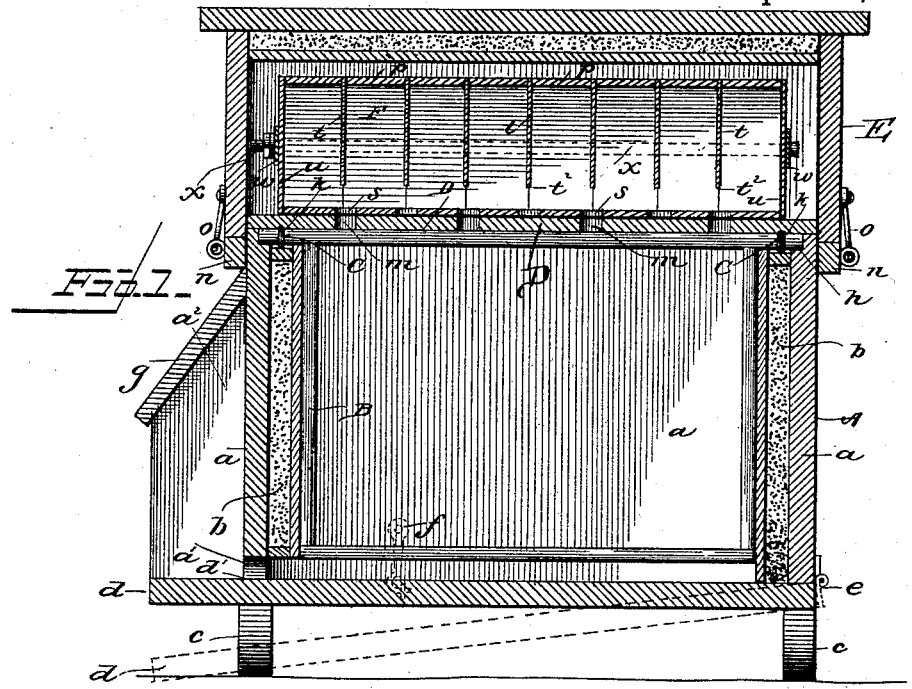
Figure 2:
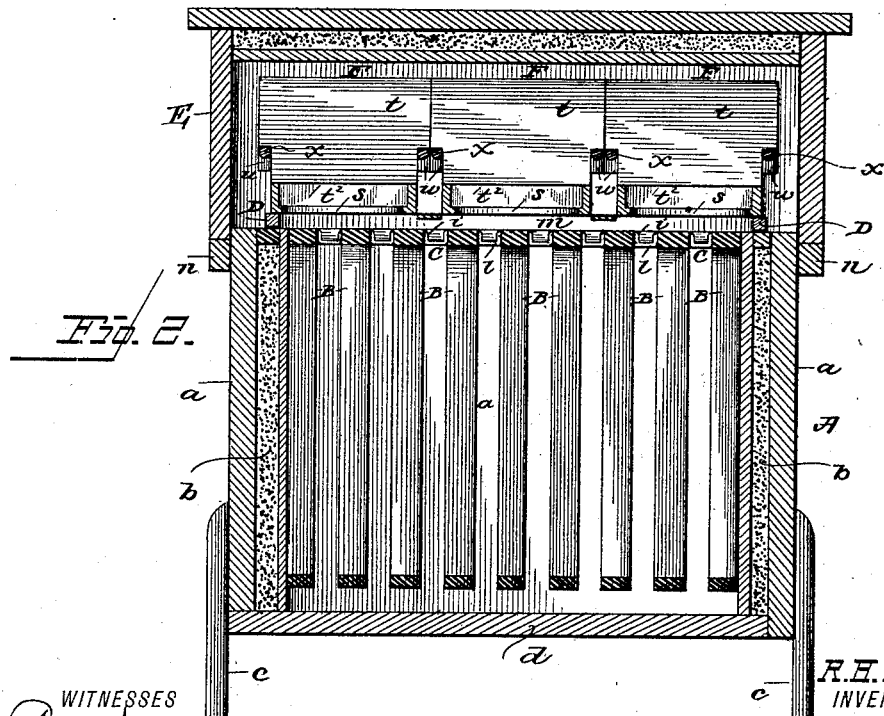

In the accompanying drawings, Figure 1 is a vertical longitudinal section of a bee-hive that embodies my invention. Fig. 2 is a vertical transverse section of the same. Fig. 3 is a detailed perspective view of one of the honey-cases. Fig. 4 is a detailed perspective of one of the wires for separating and securing the brood-frames, showing it applied thereto.

A represents the brood-chamber, which is composed of the four walls $a$. These walls are of double thickness, as shown, and in the space between the inner and outer walls is packed sawdust, charcoal, or any other suitable non-conducting material, as at $b$, for the purpose of maintaining a nearly even temperature in the brood-chamber. The brood-chamber is provided with legs $c$ at its four corners, which raise it a suitable distance above the bench, table, or other object upon which the hive is placed. The bottom $d$ is hinged to the rear side, as at $e$, so as to adapt it to be inclined by having its front side lowered, which facilitates greatly the ingress of the bees when hiving, and which also enables the bottom to be readily cleaned when necessary. Hooks $f$, which are secured to the sides of the brood-chamber, secure the bottom in its normal horizontal position. The front end of the bottom $d$ projects beyond the front wall of the brood-chamber, as at $d'$, in order to afford ample space for the bees to alight, and an opening, $a'$, is cut in the lower edge of the front wall of the brood-chamber, in order to afford ingress to the hive for the bees. Moths which alight on the projecting portion of the bottom will in nearly every case deposit their eggs thereon instead of in the hive. The outer sides of the side walls also project forward beyond the front side of the brood-chamber, as at $a^2$, and have the upper sides of these projecting portions cut away so as to receive an inclined roof-board, $g$, which shelters the opening $a'$ from rains and storms.

B represents the brood-frames, which are rectangular in shape, and have projections $h$ which extend beyond the ends of the frames at their upper sides, as shown. These projections rest on the upper edges of the inner sides of the walls of the brood-chamber, and thereby suspend the brood-frames in said chamber.

C represents securing-wires, which are bent, as shown, and provided with keepers $i$, which are equal to the width of the upper side of the brood-frame, and which rest in notches or slits $k$ that are made on the upper sides of the projecting ends $h$ of the brood-frames, and with intermediate portions, $l$, which separate the brood-frames a suitable distance, as shown. The notches $k$ prevent the securing-wires from moving laterally. Were it not for these notches the securing-wires would be liable to be moved sidewise away from the ends of the frames, and fail to keep the latter the required distance apart. As the keepers of the wires C rest in the notches upon the upper side of the brood-frames, it will be seen that the wires will be held in place against lateral movement. The intermediate portion $l$ of the wires fitting between the brood-frames hold the same at proper distances apart, the ends of the wires C bearing against the inner faces of the side walls of chamber A.

D represents a board, which is secured on the upper edges of the walls of the brood-chamber, and is provided with the series of slotted openings $m$. This board is preferably secured in place by screws, so that it may be readily removed from the hive should it be necessary to do so in order to remove the brood-frames. A cleat, $n$, extends around the outer sides of the brood-chamber, near the upper edge thereof, and on this cleat rests the lower edges of the walls of a honey-chamber, E, which is secured in place upon the brood-chamber by the catches or hooks $o$.

F represents a series of honey-cases, which are placed on the upper side of the board D. Each of these honey-cases is composed of a series of frames, $p$, which are rectangular in shape, and which have their lower sides narrowed so as to leave a space, s, between each of the frames to permit bees to enter the frames from the openings m of the board on the brood-chamber.

Tin partition-plates t, which have extended shouldered ends t', are placed between the frames p, and extend nearly to the lower sides thereof, as at t². Panes of glass u are placed on the outer sides of the outer frames of each of the honey-cases, so as to enable the interiors of the cases to be examined.

Yokes w are placed on opposite ends of each of the honey-cases and are connected by threaded rods or bolts x, which extend along the outer sides of the cases, and are provided with nuts y for binding the frames, partition-plates, and glass ends of each of the cases together. The shouldered ends t' of the division-plates t rest upon the upper sides of the yokes w, which serve to support and prevent the plates from dropping when the yokes are loosened, and all possibility of their becoming displaced when the yokes are tightened to clamp the frames together avoided.

When the honey-cases are filled, the chamber E is taken off and the honey-cases are removed and their places filled with empty ones. The removed cases should then be placed in a dark room, and the bees which may be in them will return to the hive.

At the beginning of the season the openings m should be covered over with strips of cotton or paper, so as to confine the bees to the brood-chamber long enough to fill the brood-frames, after which time the openings should be left free for the admission of the bees to the honey-chamber.

A bee-hive thus constructed is cheap and simple, enables a swarm to be readily hived, furnishes protection against moths, and enables the honey to be safely and easily removed without the necessity of destroying the bees.

Having thus described my invention, I claim—

1. The honey-case composed of the separable frames p, the dividing-plates t, interposed between the frames and having the projecting shouldered ends t', the glass panes u, the rods x, threaded at their ends and extending along the sides of the case, plates connecting the rods, and nuts located on the threaded ends of the latter whereby the cases are secured together, the shouldered ends of the plates t resting on the rods, whereby the plates are prevented from dropping when the nuts are loosened, as set forth.

2. The combination of a bee-hive, frames which are adapted to be suspended therein, and having notches k on their upper sides, and the wires C, having the keepers i embedded in the notches of the frames, and intermediate portions, l, for separating the frames, as set forth.

In testimony that I claim the foregoing as my own I have hereto affixed my signature in presence of two witnesses.

ROBERT H. COONS.

Witnesses:
MILTON T. MULDROW,
THOMAS S. HOWELL.